United States Patent
Yang

(10) Patent No.: US 10,362,602 B2
(45) Date of Patent: Jul. 23, 2019

(54) AIR CHANNEL DETECTION METHOD AND NODE DEVICE

(71) Applicant: ZTE CORPORATION, Shenzhen (CN)

(72) Inventor: Li Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 2 days.

(21) Appl. No.: 15/546,355

(22) PCT Filed: Aug. 26, 2015

(86) PCT No.: PCT/CN2015/088163
§ 371 (c)(1),
(2) Date: Jul. 26, 2017

(87) PCT Pub. No.: WO2016/119452
PCT Pub. Date: Aug. 4, 2016

(65) Prior Publication Data
US 2018/0027589 A1  Jan. 25, 2018

(30) Foreign Application Priority Data
Jan. 26, 2015 (CN) .......................... 2015 1 0039462

(51) Int. Cl.
*H04W 74/08* (2009.01)
*H04W 16/14* (2009.01)
(Continued)

(52) U.S. Cl.
CPC ......... *H04W 74/0808* (2013.01); *H04L 25/00* (2013.01); *H04W 16/14* (2013.01); *H04W 72/04* (2013.01)

(58) Field of Classification Search
CPC . H04W 74/0808; H04W 72/04; H04W 16/14; H04L 25/00
See application file for complete search history.

(56) References Cited

U.S. PATENT DOCUMENTS

2014/0254510 A1* 9/2014 Porat ................ H04W 72/0493
370/329

FOREIGN PATENT DOCUMENTS

CN 104301273 1/2015
EP 3188433 7/2017
(Continued)

OTHER PUBLICATIONS

International Search Report for PCT/CN2015/088163, English Translation attached to original, Both completed by the Chinese Patent Office dated Nov. 10, 2015 All together 5 Pages.

*Primary Examiner* — Jackie Zuniga Abad
(74) *Attorney, Agent, or Firm* — Plumsea Law Group, LLC

(57) ABSTRACT

A clear channel detection method includes: if a node device performs a CCA detection for the first time and finds that a full bandwidth of an unlicensed carrier channel is in a busy state, the node device divides the full bandwidth of the unlicensed carrier channel into two or more sub-bandwidths for the first time according to a preset division manner; if the node device performs the CCA detection again and finds that all sub-bandwidths are in the busy state, the node device divides each of the divided sub-bandwidths into two or more sub-bandwidths for the second time according to the preset division manner, and continues to perform CCA detection until the CCA detects that any sub-bandwidth is in a clear state, or the number of CCA cycle detections is up to a maximum value, then exits from the CCA cycle detections.

14 Claims, 5 Drawing Sheets

A node device performs CCA detection on a full bandwidth of an unlicensed carrier channel for the first time, and if the CCA detects that the full bandwidth of the unlicensed carrier channel is in a busy state, the node device divides the full bandwidth of the unlicensed carrier channel into two or more sub-bandwidths for the first time according to a preset division manner — Step 601

When a CCA detection failure backoff time is reached, the node device performs CCA detection on each of the divided sub-bandwidths respectively, and if the CCA detects that all the sub-bandwidths are in the busy state, the node device divides each of the divided sub-bandwidths into two or more sub-bandwidths for the second time according to the preset division manner, and after the CCA detection failure backoff time is reached again, the node device performs CCA detection on each of the secondarily divided sub-bandwidths respectively until the CCA detects that any one of the sub-bandwidths is in a clear state, or the number of CCA cycle detections is up to a maximum value, then the node device exits from the CCA cycle detections — Step 602

(51) Int. Cl.
*H04W 72/04* (2009.01)
*H04L 25/00* (2006.01)

(56) References Cited

FOREIGN PATENT DOCUMENTS

| EP | 3226445 | A1 * | 10/2017 | ............ H04W 16/14 |
| WO | 2015009433 | | 1/2015 | |
| WO | 2014107357 | | 7/2017 | |

* cited by examiner

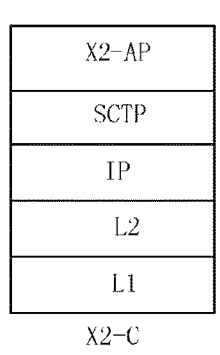
Prior Art
FIG. 2(c)
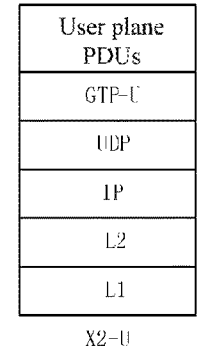
Prior Art
FIG. (d)
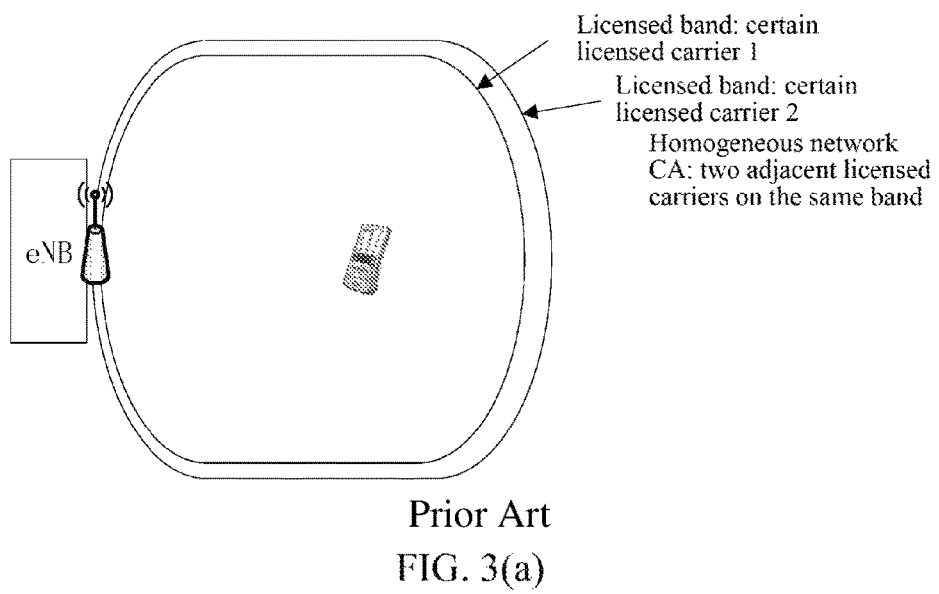
Prior Art
FIG. 3(a)

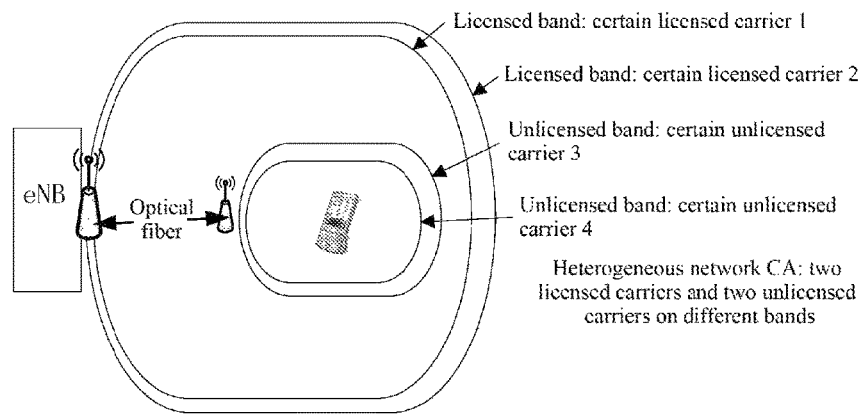
Prior Art
FIG. 3(b)
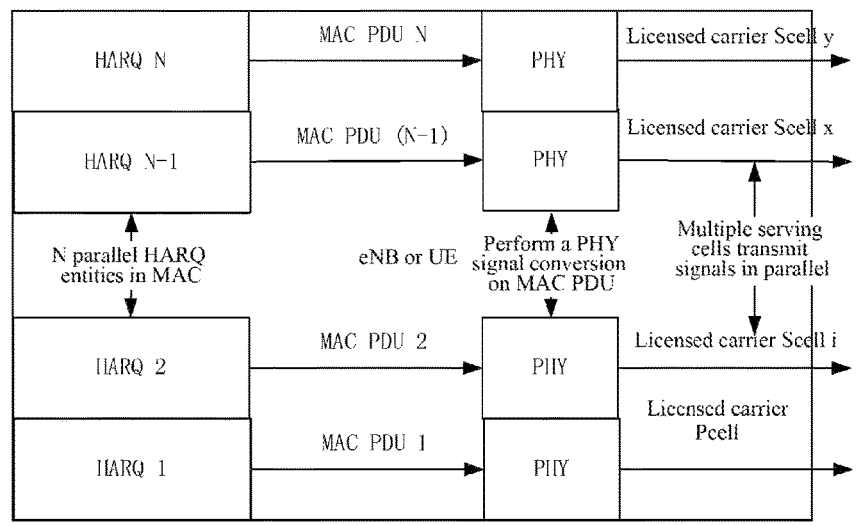
Prior Art    FIG. 4

AIR CHANNEL DETECTION METHOD AND NODE DEVICE

CROSS-REFERENCE TO RELATED APPLICATION

This application is the U.S. national phase of PCT Application No. PCT/CN2015/088163 filed Aug. 26, 2015, which claims priority to Chinese Application No. 201510039462.9 filed Jan. 26, 2015, the disclosures of which are incorporated in their entirety by reference herein.

TECHNICAL FIELD

The embodiments of the present disclosure relate to, but not limited to, a Long Term Evolution (LTE) (including a network side NW and a terminal side User Equipment (UE)) in a $3^{rd}$ Generation Partnership Project (3GPP) family system, and particularly relate to a dynamic detection and resource usage solution under a bandwidth fixed configuration of an unlicensed carrier cell.

BACKGROUND

FIG. 1 is a system architecture diagram of an LTE system in a 3GPP cellular mobile family system. The LTE system includes: a Mobility Management Entity (MME) and a Serving Gateway (SGW) at a core network side, and a UE (or called terminal) and an eNodeB (called eNB for short) at a radio access network side, and there is a Uu air interface or air interface between the UE and the eNB. There is an S1-MME (S1 for the control plane) interface between the eNB and the MME, and there is an S1-U interface between the eNB and the SGW, and there are an X2-U (X2-User plane) interface and an X2-C (X2-Control plane) interface between eNB s.

FIG. 2 (a) to FIG. 2(d) are diagrams illustrating protocol stack architectures of control planes and user planes between a UE and an eNB and a core network (MME and SGW), and protocol stack architectures of a control plane and a user plane between eNBs. Herein, a Uu air interface Media Access Control (MAC) layer protocol and a Physical Layer (PHY) protocol are contents relevant to subsequent contents of the embodiments of the present disclosure. The MAC layer mainly provides data transmission for an upper logic channel and is responsible for allocating uplink and downlink radio resources, to complete functions of Hybrid Automatic Repeat Request (HARQ), scheduling, priority processing, multiplexing (MUX), demultiplexing and the like. The PHY layer mainly provides PHY-relevant signal processing, transmission means and air interface signal conversion for data packets (MAC Protocol Data Units (PDUs)) from a transmission channel. In addition, a Radio Link Control (RLC) layer on an upper layer of the Uu air interface is mainly used for providing segmentation and retransmission service for user and control data. A Packet Data Convergence Protocol (PDCP) layer is mainly used for completing transfer of user data to the RRC layer or an upper layer of a user plane. The RRC layer is mainly used for completing broadcast, paging, radio resource control connection management, radio bearer control, mobility function, terminal measurement report and control, and the like. Relevant protocol specifications of the LTE can be queried in a public website of a 3GPP.

Before a Rel-10 version of the LTE system, a terminal and an eNB can only perform uplink and downlink communications in a cell configured on one licensed carrier, to achieve data transmitting and receiving on a single licensed carrier. At this time, the eNB configures only one serving cell for the terminal. Starting from the Rel-10 version of the LTE system, to improve a peak rate of the terminal and dynamically coordinate and utilize radio resources between multiple licensed carrier cells, the terminal and the eNB can perform uplink and downlink communications in cells configured on multiple licensed carriers, to achieve data transmitting and receiving on the multiple licensed carriers. At this time, the eNB configures multiple serving cells for the terminal: one primary serving cell (Pcell) (serving cell uniquely responsible for Physical Uplink Control Channel (PUCCH) feedback) and multiple secondary serving cells (Scell) (serving cell at least having a Physical Downlink Shared Channel (PDSCH) and/or a Physical Uplink Shared Channel (PUSCH) for data transmission). That is an LTE Carrier Aggregation (CA) technology. The current existing art is temporarily limitative of aggregation of licensed carriers, and the terminal maximally supports aggregation of five licensed carriers, and a maximum aggregation bandwidth is 5×20M=100M.

Due to relative shortage of licensed carrier resources (required to be competitively purchased by multiple operators) in a licensed band of the LTE system, and since homogeneous deployment networking of a macro cell under a macro eNB cannot satisfy increasing demands for large service traffic of an LTE user, LTE operators expect to develop and utilize unlicensed carrier resources (not required to be competitively purchased by multiple operators and can be freely competed, preempted and used by multiple operators) in an unlicensed band, and service hot spots, such as densely-populated regions, are covered by heterogeneous deployment networking of a micro cell where a micro eNB or a Low Power Node (LPN) is used. FIG. 3(a) is a diagram where two macro cells that have substantially the same uplink and downlink radio coverage and are located on two different adjacent licensed carriers in the same licensed band respectively are configured into a CA operation. A UE can perform uplink and downlink communications simultaneously with macro cells on two licensed carriers within an effective coverage range as to achieve data transmitting and receiving on dual licensed carriers. On the basis of FIG. 3(a), two LPN micro cells are added in FIG. 3(b), and are located on two different unlicensed carriers in an unlicensed band respectively, and keep synchronous in a time sequence relation with two macro cells in FIG. 3(a) through ground optical fiber coordination. Macro cells on two licensed carriers and micro cells on two unlicensed carriers can be configured together into a CA operation theoretically. The UE can perform uplink and downlink communications with the macro cells on the two licensed carriers and the micro cells on the two unlicensed carriers simultaneously within the effective coverage range thereof, to achieve data transmitting and receiving on multiple carriers.

FIG. 4 is a working architecture of LTE pure-licensed CA. When an eNB or a UE serves as a transmitter, N parallel HARQ entities are configured in an MAC protocol entity, and N HARQ data packets (or referred to as MAC PDUs) generated under a specific Transmission Time Interval (TTI) (i.e., TTI for data scheduling of the eNB) are converted into specific physical waveform signals of the LTE finally by means of a series of relevant processing (such as channel coding, modulation, and resource block adaptive mapping and the like) of a PHY entity, and then are transmitted out on N licensed carriers. A UE or an eNB serving as a receiver performs opposite processing through an MAC and/or a PHY entity. Here, a unique Pcell and N−1 Scells are all configured on the licensed carriers.

FIG. 5 is a working architecture of a CA including an LTE unlicensed carrier. When an eNB or a UE serves as a transmitter, N parallel HARQ entities are configured in an MAC protocol entity. However, some of them are traditional HARQ entities (the same as the HARQ entities in FIG. 4) serving licensed carriers, whilst the other are U-HARQ entities (required to modify and enhance characteristics of the unlicensed carriers for the traditional HARQ entities) serving unlicensed carriers. N generated HARQ data packets (or MAC PDUs) are converted into specific physical waveform signals of the LTE finally by means of a series of relevant processing (such as channel coding, modulation, and resource block adaptive mapping and the like) of a PHY entity, and some of them are transmitted out on the licensed carriers, whilst the other are transmitted out on the unlicensed carriers. Likewise, PHY and U-PHY entities are distinguished here to identify difference from a traditional PHY entity. Here, there are still a Pcell on a unique licensed carrier and Scells on multiple licensed carriers as well as U-Scells on multiple unlicensed carriers.

Since resources on unlicensed carriers in a physical local region are shared by multiple eNBs and/or WIFI AP nodes of multiple identical operators and/or different operators, each eNB needs to monitor whether a detection channel is busy or clear in a Listen Before Talk (LBT) manner, and then attempts to preempt channel resources on unlicensed carriers. For example, in the same serving region, an eNB1 of an operator A configures CA: Pcell1+U-Scell for an own user UE1, and an eNB2 of an operator B configures CA: Pcell2+U-Scell for an own user UE2; Pcell1 and Pcell2 are located on licensed carriers of the operator A and the operator B respectively, and there are no problems of interference collision and channel resource sharing therebetween. However, U-Scell is located on the same unlicensed carrier, and at this time, every time the eNB of the operator A and/or B wants to transmit data on U-Scell, the eNB must monitor to detect whether the unlicensed carrier is occupied by other nodes (eNB, WIFI AP, UE or the like). For example, when the eNB1 performs Clear Channel Assessment (CCA) detection at a cycle period to determine that receiving energy on a full bandwidth of the unlicensed carrier is greater than a threshold, it is shown that the unlicensed carrier has been occupied, and the eNB1 cannot preempt a channel resource on the unlicensed carrier at this time. Then, the eNB1 usually backs off for a period of time, and waits for a next cycle time, and then executes CCA for the next time to attempt to preempt the resource on the unlicensed carrier.

A full bandwidth CCA energy detection and time backoff avoidance mechanism under a fixed configuration of a cell bandwidth on the above-mentioned unlicensed carrier has obvious technical defects. Supposed that a full bandwidth of a U-Scell on an unlicensed carrier is 20M, if the total interference energy detected by an eNB through CCA downlink is greater than a threshold, the eNB cannot know how the interference energy is distributed within the full bandwidth of 20M. For example, interference energy detected within a high 10M sub-bandwidth may be large whilst interference energy detected within a low 10M sub-bandwidth may be small, or interference energy detected within a smaller bandwidth, i.e., 5M sub-bandwidth in the 20M is small, which shows that unlicensed carrier resource on the sub-bandwidth can be preempted and used by the eNB. However, the eNB also needs to back off to a next CCA time (usually, a delay in an ms level), thus resulting in the waste of bandwidth resources and increasing a transmission delay of data packets.

SUMMARY

The following is a brief introduction for a subject described herein in detail. The brief introduction is not intended to restrict the scope of protection of claims.

Embodiments of the present disclosure provide a clear channel detection method and a node device, intended to solve the problem of low utilization rate of resource on an unlicensed carrier in the existing art.

An embodiment of the present disclosure provides a clear channel detection method, which includes that:

a node device performs a CCA detection on a full bandwidth of an unlicensed carrier channel for a first time, and if a CCA detects that the full bandwidth of the unlicensed carrier channel is in a busy state, the node device divides the full bandwidth of the unlicensed carrier channel into two or more sub-bandwidths for a first time according to a preset division manner; and when a CCA detection failure backoff time is reached, the node device performs the CCA detection on each of the divided sub-bandwidths respectively, and if the CCA detects that all the sub-bandwidths are in a busy state, the node device divides each of the divided sub-bandwidths into two or more sub-bandwidths for a second time according to the preset division manner, and after the CCA detection failure backoff time is reached again, the node device performs the CCA detection on each of the secondarily divided sub-bandwidths until the CCA detects that any one of the sub-bandwidths is in a clear state, or a number of CCA cycle detections is up to a maximum value, then the node device exits from the CCA cycle detections.

In an exemplary embodiment, after the CCA detects that any one of the sub-bandwidths is in the clear state and the node device exits from the CCA cycle detections, the method further includes that:

the node device informs a peer device of information about a detected sub-bandwidth in the clear state by means of an air interface PHY command; and the node device and the peer device transmit and receive data only on the sub-bandwidth within a next Channel Occupancy Time (COT), and after the COT, automatically release an occupied resource of the sub-bandwidth.

Herein, the information about a sub-bandwidth includes one or a combination of more of the following parameters:

an identity of the sub-bandwidth, a position of the sub-bandwidth and a serial number of the sub-bandwidth.

In an exemplary embodiment, the preset division manner includes:

equally dividing the full bandwidth of the unlicensed carrier channel into sub-bandwidths, of which the number is an integral multiple of 2, in sequence according to the number of CCA cycle detections, and a policy and a parameter used to determine busy or clear by the CCA detection on the sub-bandwidths for each time can be independent and allowed to be differently configured, and further includes a particular case of default configuration with the same policy and parameter.

In an exemplary embodiment, when the above-mentioned method is applied to Unlicensed Supplementary Downlink (U-SDL), the node device is an eNB.

In an exemplary embodiment, when the above-mentioned method is applied to Unlicensed Uplink and Downlink (U-UL/DL), the node device includes an eNB and/or a terminal.

In an exemplary embodiment, when the above-mentioned method is applied to the U-UL/DL and the node device is the eNB, the step that the node device performs the CCA detection on the full bandwidth of an unlicensed carrier channel includes: the eNB performs a downlink CCA detection on the unlicensed carrier channel.

The method further includes: the eNB informs a terminal of information about a detected sub-bandwidth in the clear state by means of an air interface PHY command, to instruct the terminal to receive downlink data only on the sub-bandwidth within a next COT.

In an exemplary embodiment, when the above-mentioned method is applied to the U-UL/DL and the node device is the terminal, the step that the node device performs the CCA detection on the full bandwidth of the unlicensed carrier channel includes: the terminal performs an uplink CCA detection on the unlicensed carrier channel.

The method further includes: the terminal informs the eNB of information about a detected sub-bandwidth in the clear state by means of an air interface PHY command, to instruct the eNB that the terminal transmits uplink data only on this sub-bandwidth within a next COT.

An embodiment of the present disclosure also provides a node device, which includes a first unit and a second unit.

The first unit is configured to perform a CCA detection on a full bandwidth of an unlicensed carrier channel, and after a CCA detection failure backoff time is reached, perform CCA detections on sub-bandwidths divided by the second unit respectively until a CCA detects that any one of the sub-bandwidths is in a clear state, or a number of CCA cycle detections is up to a maximum value, then exit from the CCA cycle detections; and the second unit is configured to, when the CCA detects that the full bandwidth of the unlicensed carrier channel is in a busy state, divide the full bandwidth of the unlicensed carrier channel into two or more sub-bandwidths for a first time according to a preset division manner, and when the CCA detects that all the divided sub-bandwidths are in the busy state, divide each of the divided sub-bandwidths into two or more sub-bandwidths for a second time according to the preset division manner.

In an exemplary embodiment, the above-mentioned device further includes:

a third unit configured to inform a peer device of information about a detected sub-bandwidth in the clear state by means of an air interface PHY command after the CCA performed by the first unit detects that any one of the sub-bandwidths is in a clear state and the first unit exits from the CCA cycle detections, and receive or transmit data only on the sub-bandwidth within a next COT, and after the COT, automatically release an occupied resource of the sub-bandwidth.

Herein, the information about a sub-bandwidth includes one or a combination of more of the following parameters:

an identity of the sub-bandwidth, a position of the sub-bandwidth and a serial number of the sub-bandwidth.

In an exemplary embodiment, in the above-mentioned device, the preset division manner includes:

equally dividing the full bandwidth of the unlicensed carrier channel into sub-bandwidths, of which the number is an integral multiple of 2, in sequence according to the number of CCA cycle detections.

In an exemplary embodiment, the above-mentioned node device is an eNB or a terminal.

An embodiment of the present disclosure also provides a computer-readable storage medium, in which a program instruction is stored, and when the program instruction is executed, the above-mentioned method can be implemented.

The solution in the embodiments of the present disclosure can transmit data by utilizing sub-bandwidth resource on a clear unlicensed carrier as soon as possible, thus improving the utilization rate of resources, and reducing a transmission delay of a data packet.

After the drawings and the detailed descriptions are read and understood, other aspects can be understood.

BRIEF DESCRIPTION OF DRAWINGS

FIG. 2($b$) is an architecture diagram of user planes of an LTE Uu and S1 interface in the existing art.

FIG. 2($c$) is an architecture diagram of a control plane of an LTE X2 interface in the existing art.

FIG. 2($d$) is a architecture diagram of a user plane of an LTE X2 interface in the existing art.

FIG. 3($a$) is an exemplar diagram of an LTE licensed carrier aggregation in the existing art.

FIG. 3($b$) is an exemplar diagram of an LTE unlicensed carrier aggregation in the existing art.

FIG. 4 is a working architecture diagram of an LTE pure-licensed carrier aggregation in the existing art.

DETAILED DESCRIPTION

The technical solution in the embodiments of the present disclosure will be illustrated hereinbelow with reference to the drawings in detail. It is important to note that the embodiments in the present disclosure and characteristics in the embodiments may be randomly combined with each other under the condition of no conflicts.

Embodiment One

Figure 1:
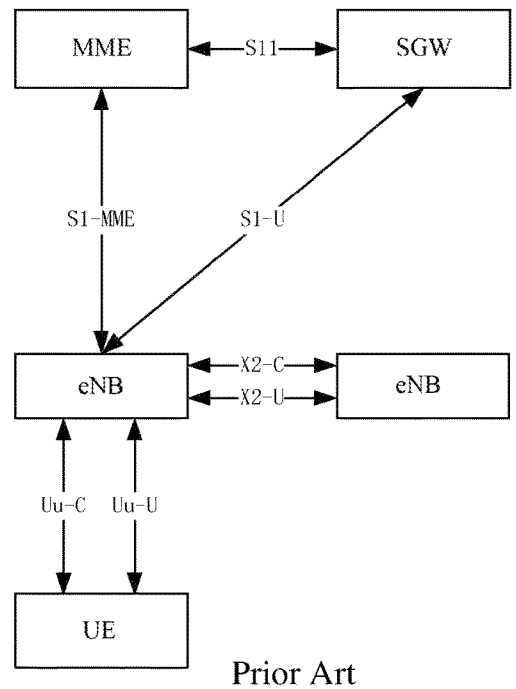
FIG. 1 is an architecture diagram of an LTE system in the existing art.
Figure 2A:
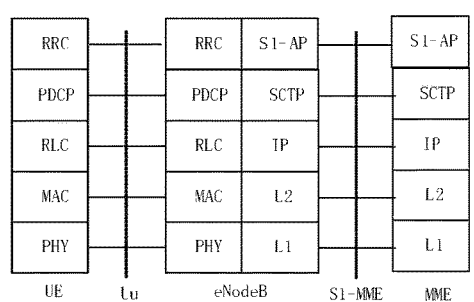
FIG. 2($a$) is an architecture diagram of control planes of an LTE Uu and S1 interface in the existing art.
Figure 2B:
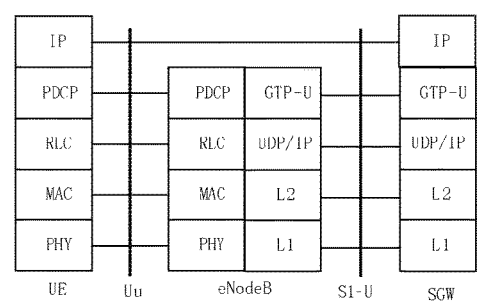
Figure 5:
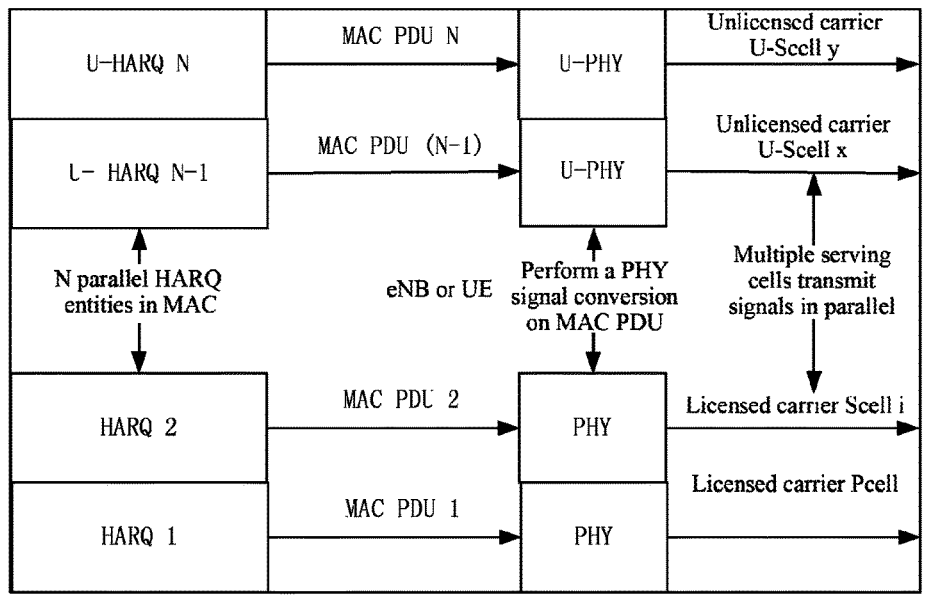
FIG. 5 is a working architecture diagram of a carrier aggregation including an LTE unlicensed carrier in the existing art.
Figure 6:
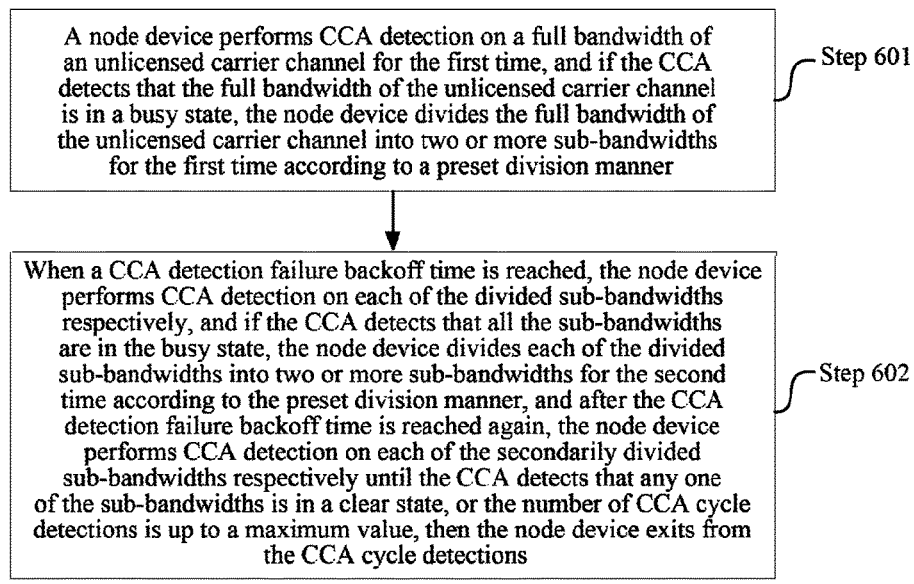
FIG. 6 is a flowchart of a method according to Embodiment one of the present disclosure.

The present embodiment provides a clear channel detection method. As shown in FIG. 6, the method mainly includes the following operations.

In step 601, a node device performs CCA detection on a full bandwidth of an unlicensed carrier channel for the first time, and if a CCA detects that the full bandwidth of the unlicensed carrier channel is in a busy state, the full bandwidth of the unlicensed carrier channel is divided into two or more sub-bandwidths for the first time according to a preset division manner.

In step 602, if a CCA detection failure backoff time is reached, the node device performs CCA detection on each of the divided sub-bandwidths respectively, and if the CCA detects that all the sub-bandwidths are in a busy state, each of the divided sub-bandwidths is divided into two or more sub-bandwidths for the second time according to the preset division manner, and after the CCA detection failure backoff time is reached again, the node device performs CCA detection on each of the secondarily divided sub-bandwidths until the CCA detects that any one of the sub-bandwidths is in a clear state, or the number of CCA cycle detections is up to a maximum value, the node device exits from the CCA cycle detections.

In addition, during CCA detection according to the above-mentioned method, after it is detected that any one of the sub-bandwidths is in a clear state and the node device exits from the CCA cycle detections, the node device may also inform a peer device of information about a detected sub-bandwidth in the clear state by means of an air interface PHY command.

The node device and the peer device transmit and receive data only on the sub-bandwidth within a next COT, and after the COT, automatically release an occupied resource of the sub-bandwidth.

In the present embodiment, the information about a sub-bandwidth is mainly used for identifying the sub-bandwidth, and may include one or a combination of more of the following parameters:

an identity of the sub-bandwidth, a position of the sub-bandwidth and a serial number of the sub-bandwidth.

It is important to note that the preset division manner in the above-mentioned method may adopt multiple manners without limitations. However, the present embodiment provides an alternative solution, namely, equally dividing the full bandwidth of the unlicensed carrier channel into sub-bandwidths, of which the number is an integral multiple of 2, in sequence according to the number of CCA cycle detections. For example, after the first CCA detection, it is judged that the full bandwidth of the unlicensed carrier channel is in a busy state, and then the second CCA detection is required to be performed. At this time, the full bandwidth of the unlicensed carrier channel may be equally divided into two sub-bandwidths. If the second CCA detection finds that both the two sub-bandwidths are in a busy state, the third CCA detection is required to be performed, then each of the two divided sub-bandwidths may be equally divided into two sub-bandwidths respectively, namely the full bandwidth of the unlicensed carrier channel is equally divided into four sub-bandwidths. By the same way, when the $N^{th}$ CCA detection is required to be performed, each of sub-bandwidths divided at the $(N-1)^{th}$ time is equally divided into two sub-bandwidths respectively, namely, the full bandwidth of the unlicensed carrier channel is equally divided into $2*(N-1)$ sub-bandwidths. By means of such operation, the information about a sub-bandwidth in the clear state can be quickly indicated with a binary identity, thus facilitating transmission of information about the sub-bandwidth.

A policy and a parameter used to determine busy or clear by means of CCA detection on the sub-bandwidths for each time may be independent and allowed to be differently configured. In addition, the preset division manner further includes a particular case, namely, default configuration of the same policy and parameter.

Herein, the above-mentioned node device may include an eNB and/or a terminal, which is different with different application scenarios. For example, a U-Scell is a pure downlink Frequency Division Duplexing (FDD) frame format cell, namely, in a U-SDL scenario, and at the time the node device can only be an eNB. A U-Scell is an uplink and downlink Time Division Duplexing (TDD) frame format cell, namely, in a U-UL/DL scenario, and at the time the node device may be an eNB, or may be a terminal, or may include an eNB and a terminal. Herein, inclusion of the eNB and the terminal refers to cooperative operation of the eNB and the terminal.

Herein, in the U-SDL scenario and the U-UL/DL scenario, detailed operations of the node device may see below.

Herein, initialization operations in different scenarios are the same, and therefore the initialization operation (S0 in FIG. 7) is introduced first.

The premise of initialization is that both the eNB and the UE have a capability of performing CA on an unlicensed carrier. The eNB provides a specific UE (i.e., UE satisfying a certain radio environment condition) served by the eNB itself with a configuration including an unlicensed carrier aggregation in the LTE by means of widely scanning, monitoring and detecting a target unlicensed band at an early stage, namely, there are at least a Pcell on a licensed carrier and one or N unlicensed carrier cells U-Scells(i) of which the full bandwidth is B(i), herein i is a cell index number. An upper layer RRC control signaling flow is involved in each configuration of CA, and once the configuration is completed, full working bandwidths of the Pcell, the Scell and the U-Scell(i) are fixed until the CA is re-configured, so a manner for using a resource of the U-Scell(i) by a system is relatively static. In addition, initialization configuration is also required to be performed on other relevant parameters. For example, a CCA detection failure backoff time is T(cca-i), and an initial value of a CCA cycle hierarchy Count(cca-i) is 1, and interference energy thresholds under a specific (i.e., certain time) CCA hierarchy are TL1, TL2, TL3 and the like, and a CCA cycle hierarchy maximum value is CCA-Stop (i.e., a maximum value allowed by the number of CCA cycle detections).

Figure 7:
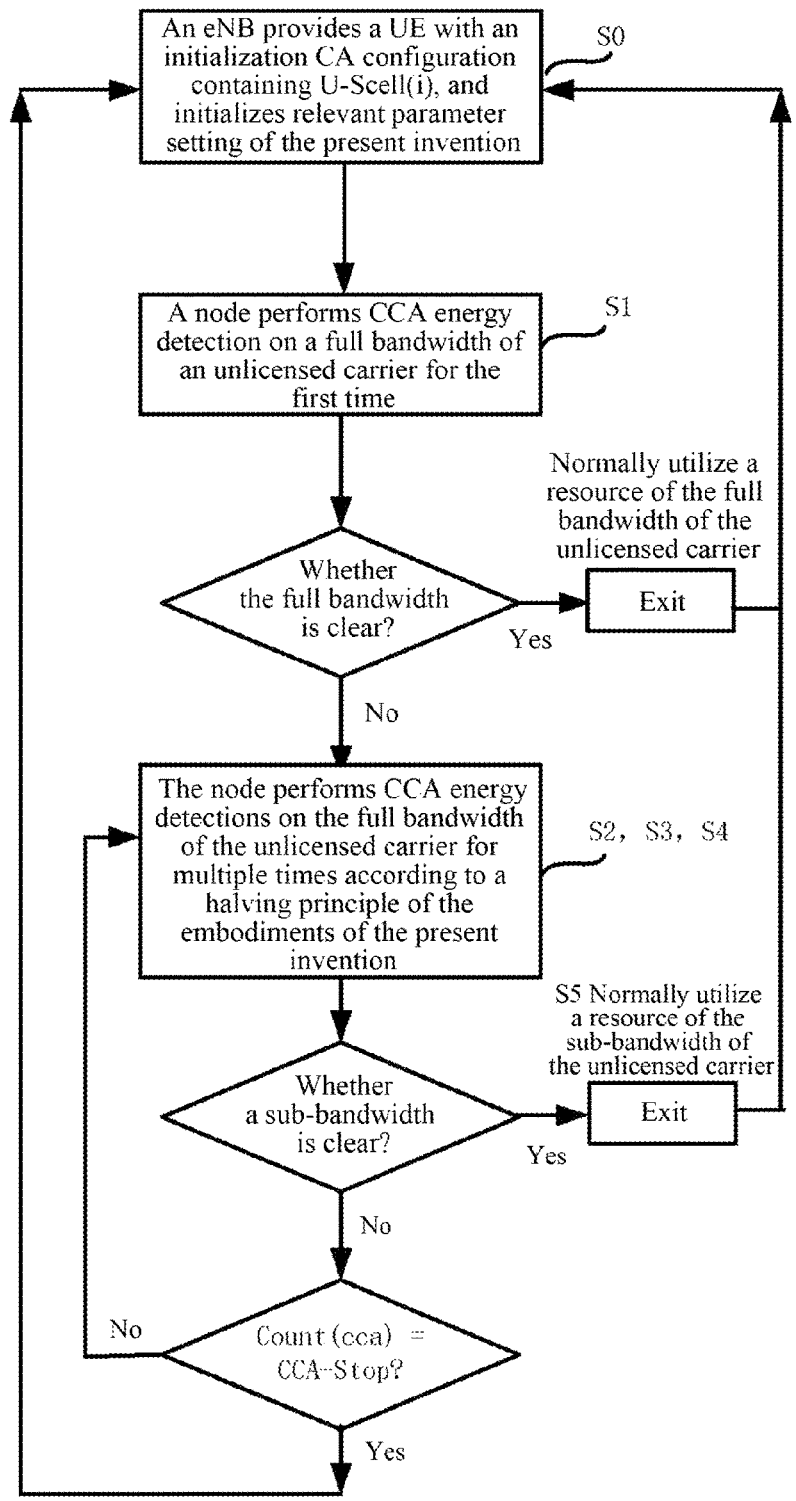
FIG. 7 is a flowchart of an embodiment of the present disclosure.

The operation of the node device in the U-SDL scenario (scenario 1) is introduced first, as shown in FIG. 7.

In S1, for a specific U-Scell(i) (satisfying a certain radio environment condition), an eNB (namely the node device in this scenario) performs downlink CCA detection at a specific time (namely when CCA detection is required) according to rules and requirements of a Load Based Equipment (LBE) or a Frame Based Equipment (FBE), and attempts to occupy an entire unlicensed carrier channel of which the full bandwidth is B(i). If energy detected by the downlink CCA is lower than a threshold TL1 (pre-defined or configured by upper layer parameters), it is shown that the channel is clear (namely the channel is in a clear state), and the eNB can occupy the full bandwidth, and exits from CCA cycle detections. If the energy detected by the downlink CCA is greater than the threshold TL1 (pre-defined or configured by upper layer parameters), it is shown that the channel is busy (namely the channel is in a busy state where interference is strong), and the eNB cannot occupy the full bandwidth. In that case, the eNB automatically and equally divides the full bandwidth B(i) into high half-segment B(i)-High/2 ('/' represents 'division', and '/' in '/2', '/4' and '/8' hereinafter represents division respectively, which will not be elaborated) sub-bandwidth and low half-segment B(i)-Low/2 sub-bandwidth. In addition, the eNB sets an own CCA cycle hierarchy counter as Count(cca-i)_eNB=Count(cca-i)_eNB+1.

In S2, on the U-Scell(i), the eNB backs off for a specific time T(cca-i) first, and the eNB does not perform any CCA detection on the U-Scell(i) with the specific time T(cca-i). But after T(cca-i), the eNB immediately performs the second CCA detection on B(i)-High/2 and B(i)-Low/2 respectively in a random order or according to a manner restricted by a preset rule. Obviously, if T(cca-i)=0, it is shown that the eNB immediately performs the second CCA detection. If the energy detected by the downlink CCA detection on B(i)-High/2 or B(i)-Low/2 sub-bandwidth is lower than a threshold TL2 (pre-defined or configured by upper layer parameters, where TL2 may be equal to TL1) for this time, it is shown that the channel is clear, and the eNB can occupy the corresponding sub-bandwidths, and exits from CCA cycle detections. If the energies detected by the downlink CCA on B(i)-High/2 and B(i)-Low/2 sub-bandwidths are all greater than the threshold TL2 (pre-defined or configured by upper layer parameters) for this time, it is shown that the channel is busy, and the eNB cannot occupy the corresponding sub-bandwidth. In this case, the eNB continues to equally divide B(i)-High/2 into two smaller sub-bandwidths, namely B(i)-High/2-High/4 and B(i)-High/2-Low/4, and then equally divides B(i)-Low/2 into two smaller sub-bandwidths namely B(i)-Low/2-High/4 and B(i)-Low/2-Low/4. In addition, the eNB configures an own CCA cycle hierarchy counter as Count(cca-i)_eNB=Count(cca-i)_eNB+1.

In S3, on the U-Scell(i), the eNB backs off for a specific time T(cca-i) again, and the eNB does not perform any CCA detection on the U-Scell(i) within the specific time T(cca-i). But after T(cca-i), the eNB immediately performs the third CCA detection on B(i)-High/2-High/4, B(i)-High/2-Low/4, B(i)-Low/2-High/4 and B(i)-Low/2-Low/4 respectively in a random order or according to a manner restricted by a preset rule. Obviously, if T(cca-i)=0, it is shown that the eNB immediately performs the third CCA detection. If the energy detected by the downlink CCA on B(i)-High/2-High/4, B(i)-High/2-Low/4, B(i)-Low/2-High/4 or B(i)-Low/2-Low/4 sub-bandwidths is lower than a threshold TL3 (pre-defined or configured by upper layer parameters, where TL3 may be equal to TL1 or TL2) for this time, it is shown that the channel is clear, and the eNB can occupy the corresponding sub-bandwidth, and exits from CCA cycle detections. If the energies detected by the downlink CCA on B(i)-High/2-High/4, B(i)-High/2-Low/4, B(i)-Low/2-High/4 and B(i)-Low/2-Low/4 sub-bandwidths are all still greater than the threshold TL3 (pre-defined or configured by upper layer parameters, where TL3 may be equal to TL1 or TL2) for this time, it is shown that the channel is busy, and the eNB still cannot occupy the corresponding sub-bandwidth. In this case, the eNB continues to equally divide B(i)-High/2-High/4 into B(i)-High/2-High/4-High/8 and B(i)-High/2-High/4-Low/8, and to equally divide B(i)-High/2-Low/4 into two smaller sub-bandwidths namely B(i)-High/2-Low/4-High/8 and B(i)-High/2-Low/4-Low/8, and to equally divide B(i)-Low/2-High/4 into B(i)-Low/2-High/4-High/8 and B(i)-Low/2-High/4-Low/8, and to equally divide B(i)-Low/2-Low/4 into two smaller sub-bandwidths namely B(i)-Low/2-Low/4-High/8 and B(i)-Low/2-Low/4-Low/8. In addition, the eNB configures an own CCA cycle hierarchy counter as Count(cca-i)_eNB=Count(cca-i)_eNB+1.

In S4, the next CCA cycle detection is performed according to a principle of performing CCA cycle detection by halving bandwidths of an unlicensed carrier. A stopping condition is: Count(cca-i)_eNB>=CCA-Stop value, or the eNB finds a clear sub-bandwidth, then the eNB automatically exits from the CCA cycle detection.

In S5, after the eNB finds a clear sub-bandwidth and exits from the CCA cycle detection, the eNB informs the UE of one or more of the following contents of an occupied sub-bandwidth in a downlink manner by means of a Uu air interface PHY command: an identity, a position and a serial number. Then, the eNB only performs Physical Downlink Control Channel (PDCCH) downlink scheduling and PDSCH data block transmitting on the occupied sub-bandwidth within a next COT. The UE only receives PDCCH and/or PDSCH data blocks on the occupied sub-bandwidth within the COT same as that of the eNB. After the next COT, the eNB will automatically release an occupied resource of the sub-bandwidth, and Count(cca-i) is reset as 1, and S1 is re-executed to restart a new COT attempting period. It is important to note that different unlicensed carrier cells U-Scell(i) may have own independent S1-S5 configurations and operations. From the perspective of an upper layer protocol such as RRC, PDCP and RLC, configuration bandwidths of the U-Scell(i) are always B(i), and sub-bandwidths actually used for data downlink transmission can be dynamically changed when the eNB performs CCA channel detection and preempts the COT to be used for each time.

The operation of the node device in the U-UL/DL scenario (scenario 2) is introduced, as shown in FIG. 7.

In this scenario, a DL manner is the same as that of the scenario 1 and will not be elaborated, and downlink CCA detection and resource preempting performed by the eNB are just limited at a TDD DL subframe position. For UL, the UE performs uplink CCA detection and the resource preempting performed by the corresponding UE is just limited at a TDD UL subframe position. Detailed description will be made below.

In S1, for a specific U-Scell(i) (satisfying a certain radio environment condition), a UE (namely a node device in this scenario) performs uplink CCA detection at a specific time (namely when CCA detection is required) according to rules and requirements of an LBE or an FBE, and attempts to occupy an entire unlicensed carrier channel of which the full bandwidth is B(i). If energy detected by the uplink CCA is lower than a threshold TL1 (pre-defined or configured by upper layer parameters), it is shown that the channel is clear, and the UE can occupy the full bandwidth, and exits from CCA cycle detections. If the energy detected by the uplink CCA is greater than the threshold TL1 (pre-defined or configured by upper layer parameters), it is shown that the channel is busy (interference is strong), and the UE cannot occupy the full bandwidth. In this case, the UE automatically and equally divides B(i) into a high half-segment B(i)-High/2 sub-bandwidth and a low-bit half-segment B(i)-Low/2 sub-bandwidth. In addition, the UE sets an own CCA cycle hierarchy counter as Count(cca-i)_UE=Count(cca-i)_UE+1. The Count(cca-i)_UE of the UE and the Count(cca-i)_eNB maintained by the eNB under a DL scenario may be independent.

In S2, on the U-Scell(i), the UE backs off for a specific time T(cca-i) first, and the UE does not perform any CCA detection on the U-Scell(i) within the specific time T(cca-i). But after T(cca-i), the UE immediately performs the second CCA detection on B(i)-High/2 and B(i)-Low/2 respectively in a random order or according to a manner restricted by a preset rule. Obviously, if T(cca-i)=0, it is shown that the UE immediately performs the second CCA detection. If the energy detected by the uplink CCA on B(i)-High/2 or B(i)-Low/2 sub-bandwidth is lower than a threshold TL2 (pre-defined or configured by upper layer parameters, where TL2 may be equal to TL1) for this time, it is shown that the channel is clear, and the UE can occupy the corresponding sub-bandwidth, and exits from CCA cycle detections. If the energies detected by the uplink CCA on B(i)-High/2 and B(i)-Low/2 sub-bandwidths are all greater than the threshold TL2 (pre-defined or configured by upper layer parameters) for this time, it is shown that the channel is busy, and the UE still cannot occupy the corresponding sub-bandwidth. In this case, the UE continue to equally divide B(i)-High/2 into two smaller sub-bandwidths namely B(i)-High/2-High/4 and B(i)-High/2-Low/4, and to equally divide B(i)-Low/2 into two smaller sub-bandwidths namely B(i)-Low/2-High/4 and B(i)-Low/2-Low/4. In addition, the UE sets an own CCA cycle hierarchy counter as Count(cca-i)_UE=Count(cca-i)_UE+1.

In S3, on the U-Scell(i), the UE backs off for a specific time T(cca-i) again, and the UE does not perform any CCA detection on the U-Scell(i) within the specific time T(cca-i). But after T(cca-i), the UE immediately performs the third CCA detection on B(i)-High/2-High/4, B(i)-High/2-Low/4, B(i)-Low/2-High/4 and B(i)-Low/2-Low/4 respectively in a random order or according to a manner restricted by a preset rule. Obviously, if T(cca-i)=0, it is shown that the UE immediately performs the third CCA detection. If energy detected by uplink CCA detection on B(i)-High/2-High/4, B(i)-High/2-Low/4, B(i)-Low/2-High/4 or B(i)-Low/2-Low/4 sub-bandwidth is lower than a threshold TL3 (pre-defined or configured by upper layer parameters, where TL3 may be equal to TL1 or TL2) for this time, it is shown that the channel is clear, and the UE can occupy the corresponding sub-bandwidth, and exits from CCA cycle detections. If the energies detected by the uplink CCA on B(i)-High/2-High/4, B(i)-High/2-Low/4, B(i)-Low/2-High/4 and B(i)-Low/2-Low/4 sub-bandwidths are all greater than the threshold TL3 (pre-defined or configured by upper layer parameters, where TL3 may be equal to TL1 or TL2) for this time, it is shown that the channel is busy, and the UE still cannot occupy the corresponding sub-bandwidth. In this case, the UE continues to equally divide B(i)-High/2-High/4 into B(i)-High/2-High/4-High/8 and B(i)-High/2-High/4-Low/8, and to equally divide B(i)-High/2-Low/4 into two smaller sub-bandwidths, namely B(i)-High/2-Low/4-High/8 and B(i)-High/2-Low/4-Low/8, and to equally divide B(i)-Low/2-High/4 into B(i)-Low/2-High/4-High/8 and B(i)-Low/2-High/4-Low/8, and to equally divide B(i)-Low/2-Low/4 into two smaller sub-bandwidths, namely B(i)-Low/2-Low/4-High/8 and B(i)-Low/2-Low/4-Low/8. In addition, the UE sets an own CCA cycle hierarchy counter as Count (cca-i)_UE=Count(cca-i)_UE+1.

In S4, the next CCA cycle detection operation is performed according to a principle of performing CCA cycle detection by halving bandwidths on an unlicensed carrier. A stopping condition is: Count(cca-i)_UE>=CCA-Stop value, or the UE finds a clear sub-bandwidth, then the UE automatically exits from the CCA cycle detection.

In S5, after the UE finds a clear sub-bandwidth and exits from the CCA cycle detection, the UE informs the eNB of one or more of the following contents of an occupied sub-bandwidth in a downlink manner by means of a Uu air interface PHY command: an identity, a position and a serial number. Then, the UE only transmits PUSCH data blocks on the occupied sub-bandwidth within a next COT (the UE accepts PDCCH uplink scheduling transmitted from the eNB). The eNB only receives the PUSCH data blocks on the sub-bandwidth occupied by the UE within the COT same as that of the UE. After the next COT, the UE will automatically release an occupied resource of the sub-bandwidth, and Count(cca-i)_UE is reset as 1, and S1 is re-executed to restart a new COT attempting period. It is important to note that different unlicensed carrier cells U-Scell(i) may have own independent S1-S5 configurations and operations. From the perspective of an upper layer protocol such as RRC, PDCP and RLC, configuration bandwidths of the U-Scell(i) are always B(i), and sub-bandwidths actually used for data uplink transmission can be dynamically changed when the UE performs CCA channel detection and preempts the COT to be used for each time.

From the above-mentioned description, it can be seen that processing ideas under the scenario 1 and the scenario 2 are substantially consistent, however, node devices participating in preempting of unlicensed carrier resource are different: in the scenario 1, only the eNB participates in downlink preempting; in the scenario 2, the eNB participates in downlink preempting and the UE participates in uplink preempting, and the downlink preempting and the uplink preempting are staggered at a TDD subframe position, therefore it is shown that the node device may be the eNB, and may also be the UE. The process is as shown in FIG. 7.

An implementation process of the above-mentioned method is illustrated hereinbelow with reference to practical application.

Supposed that an eNB of an operator A provides a specific UE1 (i.e., UE1 satisfying a certain radio environment condition) served by the eNB itself with a configuration that an LTE has an unlicensed carrier aggregation: Pcell(10M: UL/DL)+U-Scell(20M: U-SDL) by widely scanning, monitoring and detecting a target unlicensed band 5150 MHz-5350 MHz at an early stage. CA and relevant parameter configuration are initialized by adopting an RRC configuration flow of LTE. An initialization value of CCA cycle hierarchy counter Count(cca)_eNB of the eNB is 1, CCA-Stop=3, TL1=TL2=TL3=−62 dBm, and T(cca)=10 us. Due to only one U-Scell here, a cell index i is simplified and omitted. Then, the eNB attempts to preempt and utilize downlink channel resource of the U-Scell in a PDCCH cross-carrier scheduling manner, namely only PDSCH data blocks are transmitted on the downlink of the U-Scell, and PDCCH downlink scheduling and PUCCH uplink feedback are transmitted only on the Pcell.

In this case, a clear channel detection process includes the following operations.

In S101, for the U-Scell, the eNB adopts a frame structure and rule of an FBE, and a frame length is configured into fixed 10 ms (same as a frame length of a Pcell). The eNB performs downlink CCA detection at a specific time (when CCA detection is required) periodically, and attempts to occupy an entire unlicensed carrier channel of which the full bandwidth is 20M, and an unlicensed carrier frequency point is 5180 MHz-5200 MHz. A first CCA downlink energy detection result is greater than TL1=−62 dBm, therefore the eNB cannot occupy the U-Scell in a full bandwidth manner. At this time, the eNB automatically and equally divides 20M into high half-segment B(i)-High/2 sub-bandwidth (5190 MHz-5200 MHz) and low half-segment B(i)-Low/2 sub-bandwidth (5180 MHz-5190 MHz). In addition, the eNB adds 1 to a current Count(cca)_eNB value to obtain 2.

In S102, the eNB backs off for T(cca)=10 us first, and after 10 us, the eNB immediately performs the second CCA detection on B(i)-High/2 and B(i)-Low/2 respectively in a random order or according to a manner restricted by a preset rule. Energy results for downlink CCA detections on B(i)-High/2 sub-bandwidth (5190 MHz-5200 MHz) and B(i)-Low/2 sub-bandwidth (5180 MHz-5190 MHz) are all still be greater than TL2=−62 dBm. In this case, the eNB continues to equally divide B(i)-High/2 into two smaller sub-bandwidths, namely B(i)-High/2-High/4 (5195 MHz-5200 MHz) and B(i)-High/2-Low/4 (5190 MHz-5195 MHz), and to equally divide B(i)-Low/2 into two smaller sub-bandwidths, namely B(i)-Low/2-High/4 (5185 MHz-5190 MHz) and B(i)-Low/2-Low/4 (5180 MHz-5185 MHz). In addition, the eNB adds 1 to a current Count(cca)_eNB value to obtain 3.

In S103, the eNB then backs off for T(cca)=10 us, and after 10 us, the eNB immediately performs the third CCA detection on B(i)-High/2-High/4, B(i)-High/2-Low/4, B(i)-

Low/2-High/4 and B(i)-Low/2-Low/4 respectively in a random order or according to a manner restricted by a preset rule. Herein, an energy result for downlink CCA detection on B(i)-High/2-Low/4 (5190 MHz-5195 MHz) sub-bandwidth is smaller than TL3=−62 dBm, it is shown that the channel is clear, and the eNB can occupy the corresponding sub-bandwidth, and exits from CCA cycle detections.

In S104, the eNB has found a clear sub-bandwidth, and thus automatically exits from CCA cycle detections.

In S105, the eNB informs the UE of one or more of the following contents of an occupied sub-bandwidth in a downlink manner by means of a Uu air interface PDCCH PHY command: an identity, a position and a serial number (the default is that: identities from a high band to a low band, namely 5195 MHz-5200 MHz, 5190 MHz-5195 MHz, 5185 MHz-5190 MHz and 5180 MHz-5185 MHz are 00, 01, 10 and 11, and since the eNB preempts clear B(i)-High/2-Low/4 (5190 MHz-5195 MHz), the eNB transmits the identity 01 to the UE). The eNB only transmits PDSCH data blocks on the occupied sub-bandwidth within a next COT (downlink OFDM RB resource is limited within the sub-bandwidth (5190 MHz-5195 MHz)). The UE only receives the PDSCH data blocks on the occupied sub-bandwidth within the COT same as that of the eNB. After the next COT, the eNB will automatically release an occupied resource of the sub-bandwidth, and Count(cca)_eNB is reset as 1, and the operation returns to S101.

Also supposed that an eNB of an operator B provides a specific UE2 (i.e., UE2 satisfying a certain radio environment condition) served by the eNB itself with a configuration that an LTE has a licensed and unlicensed carrier mixed aggregation: Pcell(20M: UL/DL)+Scell(20M: UL/DL)+U-Scell(20M: U-UL/DL) by widely scanning, monitoring and detecting a target unlicensed band 5150 MHz-5350 MHz at an early stage. CA and relevant parameter configuration are initialized by adopting an RRC configuration flow of LTE. An initialization value of CCA cycle hierarchy counter Count(cca)_eNB of the eNB is 1, and an initialization value of CCA cycle hierarchy counter Count(cca)_UE of the UE is 1, CCA-Stop=2, TL1=TL2=−72 dBm, and T(cca)=0 us. Due to only one U-Scell here, a cell index i is also simplified and omitted. Then, the eNB attempts to preempt and utilize downlink channel resource of the U-Scell in a PDCCH cross-carrier scheduling manner, namely only PDSCH data blocks are transmitted on the downlink of the U-Scell, and the UE attempts to preempt and utilize uplink channel resource of the U-Scell by receiving the PDCCH cross-carrier scheduling manner, namely only PUSCH data blocks are transmitted on the uplink of the U-Scell. PDCCH uplink and downlink scheduling and PUCCH uplink feedback are transmitted only on the Pcell.

In this case, the clear channel detection process includes the following operations, which mainly include two aspects of operations, i.e., operation on the eNB and operation the UE.

For the U-Scell, both the eNB and the UE adopt a frame structure and rule of an FBE, and a frame length is configured into fixed 10 ms (same as a frame length of a Pcell). The eNB performs downlink CCA detection at a first specific time (when CCA detection is required) periodically whilst the UE performs uplink CCA detection at a second specific time (when CCA detection is required, which may be same as or different from the first specific time) periodically, and the eNB and the UE attempt to occupy an entire unlicensed carrier channel of which the full bandwidth is 20M, and an unlicensed carrier frequency point is 5200 MHz-5220 MHz. A first CCA downlink energy detection result of the eNB is greater than TL1=−72 dBm, therefore the eNB cannot occupy the U-Scell with the full bandwidth. At this time, the eNB automatically and equally divides 20M into a high half-segment B(i)-High/2 sub-bandwidth (5210 MHz-5220 MHz) and a low half-segment B(i)-Low/2 sub-bandwidth (5200 MHz-5210 MHz). In addition, the eNB adds 1 to a current Count(cca)_eNB value to obtain 2. A first CCA uplink energy detection result of the UE is greater than TL1=−72 dBm, therefore the UE cannot occupy the U-Scell with the full bandwidth. At this time, the UE automatically and equally divides 20M into a high half-segment B(i)-High/2 sub-bandwidth (5210 MHz-5220 MHz) and a low half-segment B(i)-Low/2 sub-bandwidth (5200 MHz-5210 MHz). In addition, the UE adds 1 to a current Count(cca)_UE value to obtain 2. On the other hand, due to T(cca)=10 us, the eNB immediately performs the second CCA detection on B(i)-High/2 and B(i)-Low/2 respectively in a random order or according to a manner restricted by a preset rule. Energy results for downlink CCA detections on the B(i)-High/2 sub-bandwidth (5210 MHz-5220 MHz) and the B(i)-Low/2 sub-bandwidth (5200 MHz-5210 MHz) are all still greater than TL2=−72 dBm. Due to Count(cca)_eNB=CCA-Stop=2, the eNB no longer performs downlink CCA detections on sub-bandwidths. Meanwhile, the UE immediately performs the second CCA uplink detection on B(i)-High/2 and B(i)-Low/2 respectively in a random order or according to a manner restricted by a preset rule. Herein, an energy result for uplink CCA detection on the B(i)-High/2 sub-bandwidth (5210 MHz-5220 MHz) is smaller than TL2=−72 dBm. It is shown that the channel is clear, and the UE can occupy the corresponding sub-bandwidth, and exits from CCA cycle detections. Since the eNB cannot find a clear sub-bandwidth, the eNB automatically exits from the CCA cycle detections. The UE finds that the B(i)-High/2 sub-bandwidth (5210 MHz-5220 MHz) is clear, uplink transmission of PUSCH data blocks can be performed within a subsequent COT by utilizing the sub-bandwidth. Here, what is worthy of being illustrating is that although a TDD unlicensed carrier channel between the eNB and the UE has propagation reciprocity, interference environments are slightly different due to different physical positions of the eNB and the UE. Therefore, in the same full bandwidth or sub-bandwidth, interference energy detected by the eNB may be different from interference energy detected by the UE. Just as mentioned in S202, energy detected by the eNB on the B(i)-High/2 sub-bandwidth (5210 MHz-5220 MHz) is greater than TL2=−72 dBm, but energy detected by the UE on the B(i)-High/2 sub-bandwidth (5210 MHz-5220 MHz) is smaller than TL2=−72 dBm. So, the eNB cannot utilize a resource of a TDD downlink subframe in the B(i)-High/2 sub-bandwidth (5210 MHz-5220 MHz), but the UE can utilize a resource of a TDD uplink subframe in the B(i)-High/2 sub-bandwidth (5210 MHz-5220 MHz). The UE feeds one or more of the following contents of an occupied sub-bandwidth back to the eNB by means of a Uu air interface PUCCH PHY command in an uplink manner: an identity, a position and a serial number (the default is that identities from a high band to a low band, namely 5210 MHz-5220 MHz and 5200 MHz-5210 MHz, are 0 and 1, and since the UE preempts B(i)-High/2 (5210 MHz-5220 MHz), the UE feeds the identity 0 back to the eNB). The eNB only performs uplink scheduling and receiving of PUSCH data blocks on the occupied sub-bandwidth within a next COT. SC-FDM RB resource utilized for uplink transmission of the UE is limited within the sub-bandwidth (5210 MHz-5220 MHz). After the COT, the UE will automatically release an occupied resource of the sub-bandwidth, and both Count (cca)_eNB and Count(cca)_UE are reset as 1, and the operation will return to S201.

Embodiment Two

The present embodiment provides a node device, which at least includes a first unit and a second unit.

The first unit is configured to perform CCA detection on a full bandwidth of an unlicensed carrier channel mainly, and after a CCA detection failure backoff time is reached, perform CCA detection on sub-bandwidths divided by the second unit respectively until a CCA detects that any one of the sub-bandwidths is in a clear state, or the number of CCA cycle detections is up to a maximum value, exit from the CCA cycle detections.

The second unit is configured to, when the CCA detects that the full bandwidth of the unlicensed carrier channel is in a busy state, divide the full bandwidth of the unlicensed carrier channel into two or more sub-bandwidths for the first time according to a preset division manner, and when the CCA detects that all the divided sub-bandwidths are in a busy state, divide each of the divided sub-bandwidths into two or more sub-bandwidths for the second time according to the preset division manner.

In addition, the above-mentioned device may further include a third unit. The unit is configured to be able to inform a peer device of information about a detected sub-bandwidth in the clear state by means of an air interface PHY command after the CCA performed by the first unit detects that any one of the sub-bandwidths is in a clear state and the first unit exits from the CCA cycle detections, and receive or transmit data only on the sub-bandwidth within a next COT, and after the COT, automatically release an occupied resource of the sub-bandwidth.

In the present embodiment, the information about a sub-bandwidth is mainly used for identifying the sub-bandwidth, and may include one or a combination of more of the following parameters:

an identity of the sub-bandwidth, a position of the sub-bandwidth and a serial number of the sub-bandwidth.

It is important to note that the preset division manner adopted by the above-mentioned node device may be diversified and will not be limited in the present embodiment. However, the present embodiment provides an alternative solution, namely, equally dividing the full bandwidth of the unlicensed carrier channel into sub-bandwidths of which the number is an integral multiple of 2 in sequence according to the number of CCA cycle detections. For example, when the second CCA detection is required to be performed, the full bandwidth of the unlicensed carrier channel may be equally divided into two sub-bandwidths. When the third CCA detection is required to be performed, the full bandwidth of the unlicensed carrier channel may be equally divided into four sub-bandwidths. Likewise, when the Nth CCA detection is required to be performed, the full bandwidth of the unlicensed carrier channel may be equally divided into $2*(N-1)$ sub-bandwidths. By means of such operation, the information about the detected sub-bandwidth in the clear state can be conveniently and quickly identified.

In practical application, the above-mentioned node device may be an eNB or a terminal, and can be determined according to different scenarios. For example, since a U-Scell is a pure downlink FDD frame format cell in a U-SDL scenario, the node device is an eNB; and since a U-Scell is an uplink and downlink TDD frame format cell in a U-UL/DL scenario, the node device may be an eNB or a terminal. But it needs to be emphasized that in the U-UL/DL scenario, when the node device is an eNB, a first unit in the eNB mainly performs downlink CCA detection on an unlicensed carrier channel; and when the node device is a terminal, a first unit in the terminal performs uplink CCA detection on an unlicensed carrier channel.

The node device in the present embodiment can implement the method in Embodiment one, therefore, other detailed operations of the node device may refer to corresponding contents in Embodiment one, and will not be elaborated herein.

Those ordinary skilled in the art may understand that all or some steps in the above-mentioned method may be completed by instructing relevant hardware via a program, and the program may be stored in a computer-readable storage medium such as a read-only memory, a magnetic disk or an optical disk or the like. In an exemplary embodiment, all or some steps in the above-mentioned embodiments may be implemented by using one or more integrated circuits. Correspondingly, each module/unit in the above-mentioned embodiments may be implemented in a hardware form or may be implemented in a software function module form. The embodiments of the present disclosure are not limited to combinations of hardware and software in any specific forms.

INDUSTRIAL APPLICABILITY

The solution in the embodiments of the present disclosure can transmit data by utilizing sub-bandwidth resource on a clear unlicensed carrier as soon as possible, thus improving the utilization rate of resources, and reducing a transmission delay of a data packet.

What we claim is:

1. A clear channel detection method, comprising:
performing, by a node device, a Clear Channel Assessment, CCA, detection on a full bandwidth of an unlicensed carrier channel for a first time, and if a CCA detects that the full bandwidth of the unlicensed carrier channel is in a busy state, dividing the full bandwidth of the unlicensed carrier channel into two or more sub-bandwidths for a first time according to a preset division manner; and
when a CCA detection failure backoff time is reached, performing, by the node device, the CCA detection on each of the divided sub-bandwidths respectively, and if the CCA detects that all the sub-bandwidths are in a busy state, dividing each of the divided sub-bandwidths into two or more sub-bandwidths for a second time according to the preset division manner, and after the CCA detection failure backoff time is reached again, performing the CCA detection on each of the secondarily divided sub-bandwidths until the CCA detects that any one of the sub-bandwidths is in a clear state, or a number of CCA cycle detections is up to a maximum value, then exiting from the CCA cycle detections;
wherein the preset division manner comprises:
equally dividing the full bandwidth of the unlicensed carrier channel into sub-bandwidths, of which the number is an integral multiple of 2, in sequence according to the number of the CCA cycle detections, and a policy and a parameter used to determine busy or clear by the CCA detection on the sub-bandwidths for each time can be independent and allowed to be differently configured, and further comprises a particular case of default configuration with the same policy and parameter.

2. The method according to claim 1, wherein after the CCA detects that any one of the sub-bandwidths is in the clear state and the node device exits from the CCA cycle detections, the method further comprises:

informing, by the node device, a peer device of information about a detected sub-bandwidth in the clear state by means of an air interface Physical Layer, PHY, command; and transmitting and receiving, by the node device and the peer device, data only on the sub-bandwidth within a next Channel Occupancy Time, COT, and after the COT, automatically releasing an occupied resource of the sub-bandwidth;

wherein the information about a sub-bandwidth comprises one or a combination of more of the following parameters:

an identity of the sub-bandwidth, a position of the sub-bandwidth and a serial number of the sub-bandwidth.

3. The method according to claim 1, wherein when the method is applied to Unlicensed Supplementary Downlink, U-SDL, the node device is an evolved Node B, eNB.

4. The method according to claim 1, wherein when the method is applied to Unlicensed Uplink and Downlink, U-UL/DL, the node device comprises an eNB and/or a terminal.

5. The method according to claim 4, wherein when the method is applied to the U-UL/DL and the node device is the eNB, performing, by the node device, the CCA detection on the full bandwidth of the unlicensed carrier channel comprises: performing, by the eNB, a downlink CCA detection on the unlicensed carrier channel; and the method further comprises: informing, by the eNB, a terminal of information about a detected sub-bandwidth in the clear state by means of the air interface PHY command, to instruct the terminal to receive downlink data only on the sub-bandwidth within a next COT.

6. The method according to claim 4, wherein when the method is applied to the U-UL/DL and the node device is the terminal, performing, by the node device, the CCA detection on the full bandwidth of the unlicensed carrier channel comprises: performing, by the terminal, an uplink CCA detection on the unlicensed carrier channel; and the method further comprises: informing, by the terminal, an eNB of information about a detected sub-bandwidth in the clear state, to instruct the eNB that the terminal transmits uplink data only on the sub-bandwidth within a next COT.

7. A node device, comprising hardware performing instructions stored in a non-transitory computer readable medium which executes steps in following units: a first unit and a second unit, wherein the first unit is configured to perform a Clear Channel Assessment, CCA, detection on a full bandwidth of an unlicensed carrier channel, and after a CCA detection failure backoff time is reached, perform CCA detections on sub-bandwidths divided by the second unit respectively until a CCA detects that any one of the sub-bandwidths is in a clear state, or a number of CCA cycle detections is up to a maximum value, then exit from the CCA cycle detections; and the second unit is configured to, when the CCA detects that the full bandwidth of the unlicensed carrier channel is in a busy state, divide the full bandwidth of the unlicensed carrier channel into two or more sub-bandwidths for a first time according to a preset division manner, and when the CCA detects that all the divided sub-bandwidths are in the busy state, divide each of the divided sub-bandwidths into two or more sub-bandwidths for a second time according to the preset division manner; wherein the preset division manner comprises:

equally dividing the full bandwidth of the unlicensed carrier channel into sub-bandwidths, of which the number is an integral multiple of 2, in sequence according to the number of the CCA cycle detections, and a policy and a parameter used to determine busy or clear by the CCA detection on the sub-bandwidths for each time can be independent and allowed to be differently configured, and further comprises a particular case of default configuration with the same policy and parameter.

8. The device according to claim 7, further comprising hardware performing instructions stored in a non-transitory computer readable medium which executes steps in following unit:

a third unit, configured to inform a peer device of information about a detected sub-bandwidth in the clear state by means of an air interface Physical Layer, PHY, command, after the CCA performed by the first unit detects that any one of the sub-bandwidths is in a clear state and the first unit exits from the CCA cycle detections, and receive or transmit data only on the sub-bandwidth within a next Channel Occupancy Time, COT, and after the COT, automatically release an occupied resource of the sub-bandwidth;

wherein the information about a sub-bandwidth comprises one or a combination of more of the following parameters:

an identity of the sub-bandwidth, a position of the sub-bandwidth and a serial number of the sub-bandwidth.

9. The device according to claim 7, wherein the node device is an evolved Node B, eNB, or a terminal.

10. The device according to claim 7, wherein in an Unlicensed Supplementary Downlink, U-SDL, scenario, the node device is an eNB.

11. The device according to claim 7, wherein in an Unlicensed Uplink and Downlink, U-UL/DL, scenario, the node device is an eNB or a terminal.

12. The device according to claim 7, wherein in the U-UL/DL scenario, when the node device is the eNB, performing, by the first unit, the CCA detection on the full bandwidth of the unlicensed carrier channel comprises: performing a downlink CCA detection on the unlicensed carrier channel.

13. The device according to claim 7, wherein in the U-UL/DL scenario, when the node device is the terminal, performing, by the first unit, the CCA detection on the full bandwidth of the unlicensed carrier channel comprises: performing an uplink CCA detection on the unlicensed carrier channel.

14. A non-transitory computer-readable storage medium, in which a program instruction is stored, wherein when the program instruction is executed, the method according to claim 1 can be implemented.

* * * * *

UNITED STATES PATENT AND TRADEMARK OFFICE
CERTIFICATE OF CORRECTION

PATENT NO. : 10,362,602 B2
APPLICATION NO. : 15/546355
DATED : July 23, 2019
INVENTOR(S) : Li Yang Page 1 of 1

It is certified that error appears in the above-identified patent and that said Letters Patent is hereby corrected as shown below:

On the Title Page

Item (54) and in the Specification, Column 1, Lines 1-2, In the title:
"Air Channel Detection Method and Node Device"
Should be replaced with:
-- Clear Channel Detection Method And Node Device --

Signed and Sealed this
Twenty-fourth Day of September, 2019

Andrei Iancu
*Director of the United States Patent and Trademark Office*